Oct. 30, 1928.
H. F. MASSOPUST
1,689,736
AUTOMOBILE TRUNK
Filed April 21, 1924
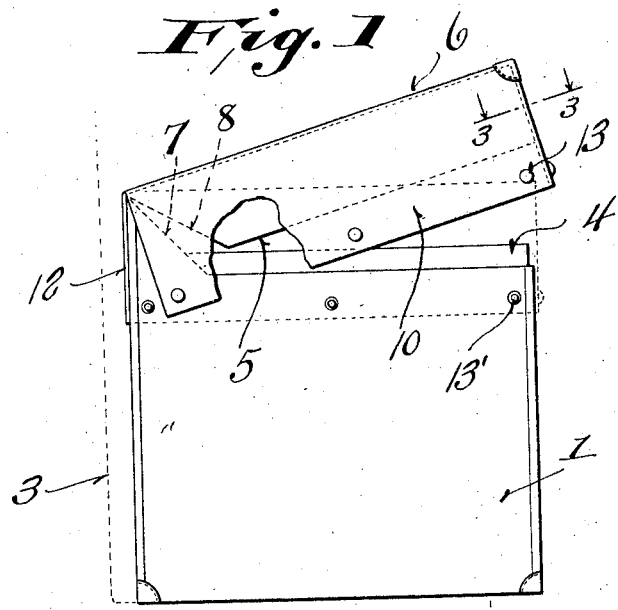
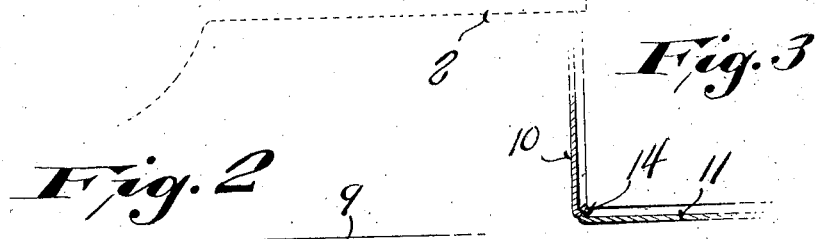
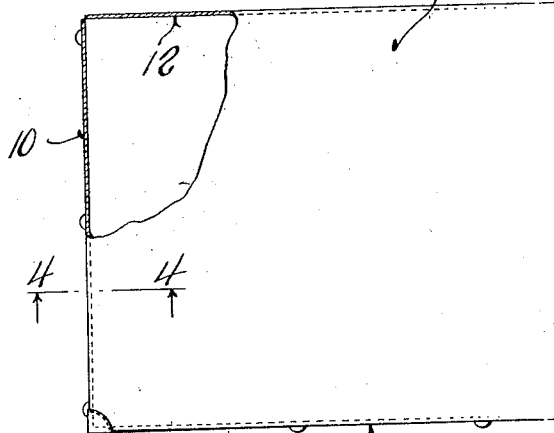
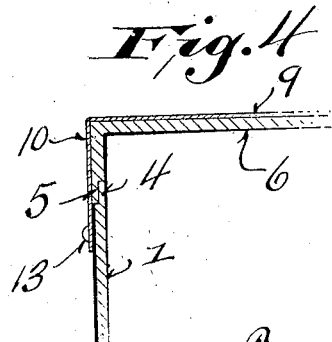
Witness
R. E. Weber
Inventor
Herbert F. Massopust
By
Attorneys Patented Oct. 30, 1928.                                                          1,689,736

UNITED STATES PATENT OFFICE.

HERBERT F. MASSOPUST, OF MILWAUKEE, WISCONSIN.

AUTOMOBILE TRUNK.

Application filed April 21, 1924. Serial No. 707,992.

This invention relates to trunks, and is particularly directed to an automobile trunk.

In automobile practice, it is the custom to locate a trunk at the rear of the automobile and, as is well known, this location is extremely dusty. It has been found that the dust, due to the draft created by the machine, is driven downwardly past this rear portion. Consequently, a trunk located at this point is in a disadvantageous position so far as dust is concerned.

This invention is designed to overcome the defects discussed above, and objects of such invention are to provide a trunk which may be located at the rear of the automobile and yet which is absolutely dust proof and water proof for all practical purposes. Advantage has been taken of the downward direction of the dust stream in this invention, and means have been provided whereby the joint between the top and the body portion of the trunk is covered by a suitable member throughout the extent of the joint in such a manner that the dust or rain is shed downwardly and prevented from finding its way into the trunk.

An embodiment of the invention is shown in the accompanying drawings, in which:—

Figure 1 is a side elevation of the trunk with a part broken away showing the automobile in dotted lines.

Figure 2 is a plan view of the structure shown in Figure 1, with a corner of the trunk broken away.

Figure 3 is a sectional view on the line 3—3 of Figure 1.

Figure 4 is a sectional view on the line 4—4 of Figure 2.

The trunk comprises a body portion 1 which may, if desired, be covered with leather, imitation leather or other sheet material and is preferably provided with finishing border strips and reinforced corners. This body portion is permanently secured in any of the usual ways to the outwardly projecting shelf 2 of the automobile 3, and such trunk is located closely adjacent the rear portion of the automobile. The body part 1, as may be seen from Figure 4, is provided with an upstanding tongue 4 and with a cut out portion, adjacent such tongue, adapted to receive a corresponding tongue 5 formed upon the top portion 6. The top is hinged to the body portion adjacent the upper rear edge thereof, and it is to be noted from reference to Figure 1 that, adjacent the rear of the trunk, the body portion slants upwardly along the line 7 and a corresponding slanting part 8 is formed in the top portion.

A protecting member 9 of sheet material is secured across the upper surface of the top and is provided with downwardly extending side flaps 10, a front flap 11, and a rear flap 12. It may, if desired, be provided with suitably reinforced corners, as illustrated in Figures 1 and 2. These flaps are free from the side flanges of the top and are adapted, as shown, to extend downwardly past the joint between such side flanges and the body portion. The side flaps and the front flap are provided with snap fasteners or other suitable means 13 which cooperate with similar snap fasteners 13′ secured to the body portion. The rear flap 12 is permanently secured across the back to the body portion. The vertical edges of the side flaps 10 and the front flap 11 are secured by inturned seams 14 (see Figure 3.) It will be seen that when the tongue is closed the overlapping tongues 4 and 5 provide a good joint between the trunk and the top. However, this joint is rendered dust proof and water proof by means of the flaps carried by the cover portion,—such flaps being held tightly against the body portion, as shown in the drawings.

Obviously, if the top fits within the body portion, creases would be formed at the side and front edges of the cover each time it was closed and the cover would rapidly break along these lines. However, by providing a cover for a trunk having the downwardly extending flanges of the top, it is impossible to crack or crease the cover at these edges.

It will be seen, therefore, that dust and rain is shed by these flaps and is prevented from entering the trunk.

Although the invention has been described in considerable detail, it is to be understood that the invention may be variously embodied and is, therefore, to be limited only as claimed.

I claim:

An automobile trunk comprising a body portion, a top hinged thereto and having downwardly extending flanges forming a joint with said body portion, said joint extending upwardly along a slanting line towards the rear of said top, a cover of flexible sheet material secured to the upper face of said top and having flaps extending downwardly from the top cover portion and overlapping and projecting below the joint between the flanges and the body portion of said trunk, said flaps meeting and being permanently joined along vertical lines at the front corners of the trunk by securing means, said flaps having rear vertical edges aligning with the vertical edges of the rear portion and having a rear portion secured to the rear of said trunk, and detachable fasteners carried by the front and sides of said body portion and said flaps for securing the lower portion of said flaps tightly against said body portion, the vertical rear edges of said side flaps being free.

In testimony that I claim the foregoing I have hereunto set my hand at Milwaukee, in the county of Milwaukee, and State of Wisconsin.

HERBERT F. MASSOPUST.